United States Patent
Wang et al.

(10) Patent No.: US 11,080,404 B2
(45) Date of Patent: Aug. 3, 2021

(54) FIRMWARE UPGRADE METHOD, SLAVE STATION OF ROBOT, AND MACHINE READABLE STORAGE MEDIUM

(71) Applicant: UBTECH ROBOTICS CORP LTD, Shenzhen (CN)

(72) Inventors: Malin Wang, Shenzhen (CN); Youjun Xiong, Shenzhen (CN); Xi Bai, Shenzhen (CN); Wenhua Fan, Shenzhen (CN); Sheng Zhou, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 111 days.

(21) Appl. No.: 16/576,807

(22) Filed: Sep. 20, 2019

(65) Prior Publication Data
US 2020/0193027 A1 Jun. 18, 2020

(30) Foreign Application Priority Data
Dec. 18, 2018 (CN) .......................... 201811547665.9

(51) Int. Cl.
*G06F 8/654* (2018.01)
*G06F 9/4401* (2018.01)
*G06F 21/57* (2013.01)
*G06F 13/40* (2006.01)
*G06F 8/65* (2018.01)

(52) U.S. Cl.
CPC ............ *G06F 21/572* (2013.01); *G06F 8/654* (2018.02); *G06F 9/4411* (2013.01); *G06F 13/4022* (2013.01); *G06F 8/66* (2013.01)

(58) Field of Classification Search
CPC .......... G06F 8/654; G06F 8/66; G06F 9/4411; G06F 13/4022; G06F 21/572
USPC .......................................................... 717/168
See application file for complete search history.

(56) References Cited

U.S. PATENT DOCUMENTS

| | | | |
|---|---|---|---|
| 2007/0055970 A1* | 3/2007 | Sakuda et al. ............ | G06F 8/65 717/168 |
| 2007/0234332 A1* | 10/2007 | Brundridge et al. ..... | G06F 8/65 717/168 |
| 2010/0031347 A1* | 2/2010 | Ohto ........................ | G06F 8/65 717/168 |
| 2017/0220404 A1* | 8/2017 | Polar Seminario ..... | G06F 8/654 |
| 2018/0359144 A1* | 12/2018 | Malaspina etal. ...... | G06F 8/654 |
| 2019/0056928 A1* | 2/2019 | Smal et al. ............ | G06F 8/654 |

* cited by examiner

*Primary Examiner* — Wei Y Zhen
*Assistant Examiner* — Mohammed N Huda

(57) ABSTRACT

A firmware upgrade method for a slave station of a robot communicates with a master station of the robot via an EtherCAT bus of the robot, includes: switching a work mode of the slave station to an upgrade mode in response to a firmware upgrade instruction, receiving a new firmware corresponding to this firmware upgrade via the EtherCAT bus, storing the new firmware in a second storage area of a flash memory of the slave station, restarting the slave station after the new firmware is received, and copying the new firmware stored in the second storage area to a first storage area of the flash memory and executing the new firmware in the first storage area when the slave station is started. A slave station of the robot and a machine readable storage medium are also provided.

17 Claims, 4 Drawing Sheets

FIRMWARE UPGRADE METHOD, SLAVE STATION OF ROBOT, AND MACHINE READABLE STORAGE MEDIUM

CROSS REFERENCE TO RELATED APPLICATIONS

This application claims priority to Chinese Patent Application No. CN201811547665.9, filed Dec. 18, 2018, which is hereby incorporated by reference herein as if set forth in its entirety.

BACKGROUND

1. Technical Field

The present disclosure generally relates to communication technology, and particularly to a firmware upgrade method, a slave station of a robot, and a machine readable storage medium.

2. Description of Related Art

EtherCAT (EtherControl Automation Technology) is an Ethernet-based fieldbus system with an open architecture. Because of the EtherCAT bus, the speed of data transmission is enhanced greatly, the delay of bus nodes is reduced, and the real-time performance of the data transmission via the bus is improved greatly.

However, communication protocols of the EtherCAT bus have insufficient support for firmware upgrade of a slave station. It is very difficult to implement the firmware upgrade of the slave station based on the EtherCAT bus. It is often necessary to use a CAN bus or serial port upgrade tools, when performing the firmware upgrade of device nodes such as the slave station. It is not convenient to operate, the number of bus bundles is increased, and the security is reduced, because it need the help of the additional bus or tools.

BRIEF DESCRIPTION OF DRAWINGS

Many aspects of present embodiments can be better understood with reference to the following drawings. Components in the drawings are not necessarily drawn to scale, the emphasis placed upon clearly illustrating principles of the present embodiments. Moreover, in the drawings, all views are schematic, and like reference numerals designate corresponding parts throughout several views.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

In order to make the object, technical scheme and advantages of the present invention clearer, the following will be illustrated by means of specific embodiments with reference to accompanying drawings.

A robot includes a master station (such as a main controller) and a slave station (such as an execution node). The master station and the slave station are basic means of data communication based on an ethernet for control automation technology (EtherCAT) bus. The execution node of the robot can execute various instructions sent by the main controller of the robot, such as a sensor, or a servo, etc. At a given time, there can only be one master station on a data link. In link control, the master station can transmit data to one or more slave stations after a transmission request is received. A firmware upgrade method provided in the embodiment of the present invention performs firmware upgrade of the slave station by using the EtherCAT bus. Because it does not need the help of the additional bus or tools, the convenience of the firmware upgrade and the security of the slave station can be improved.

Figure 1:
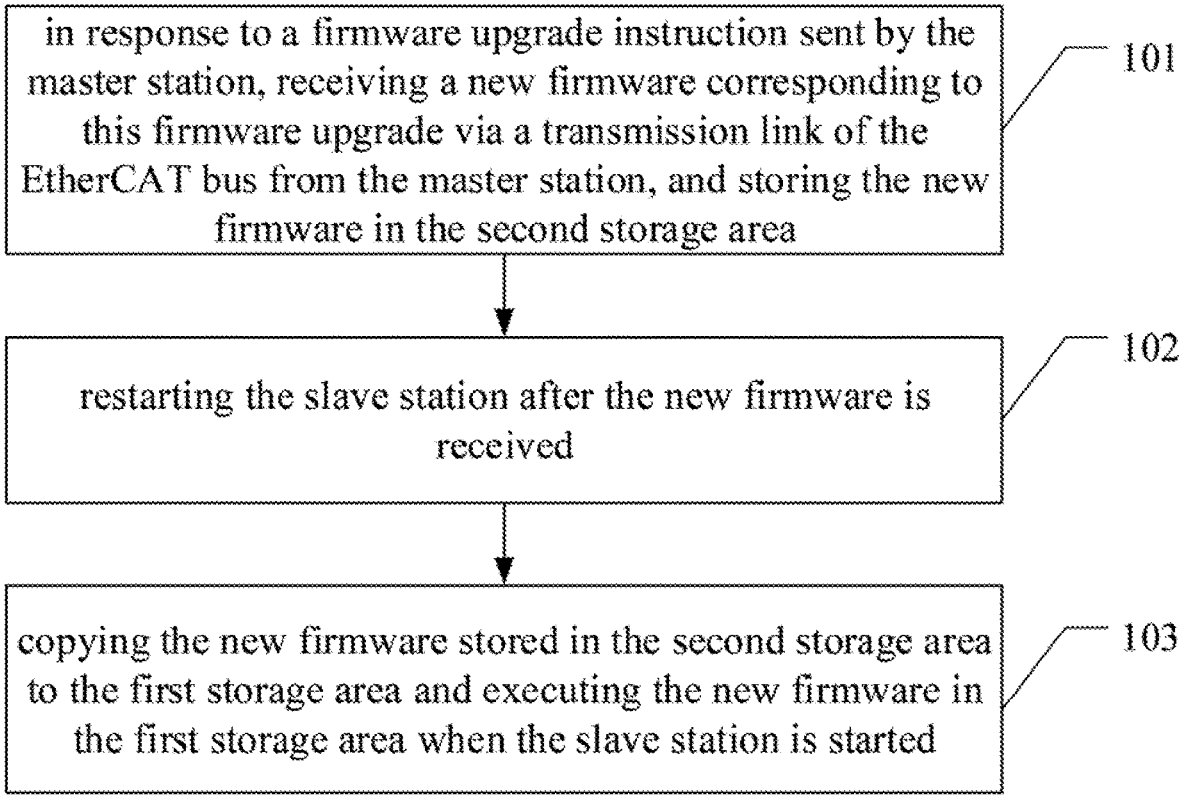
FIG. 1 is a flowchart of a firmware upgrade method for a slave station of a robot according to an embodiment of the present invention.

FIG. 1 is a flowchart of a firmware upgrade method for the slave station of the robot according to an embodiment of the present invention. The slave station has a flash memory. In normal operation, a firmware of the slave station is stored and running in the flash memory. The firmware of the slave station is configured to provide various functions, such as motor control, process transfer, communicating with the master station, etc. In the embodiment of the present invention, the master station and the slave station are electronically coupled to an EtherCAT bus of the robot, and the slave station communicates with the master station via the EtherCAT bus. The flash memory of the slave station includes a first storage area and a second storage area. The firmware of the slave station runs in the first storage area and is configured to provide various functions, such as communication, motor control, etc.

Step 101: in response to a firmware upgrade instruction sent by the master station, receiving a new firmware corresponding to this firmware upgrade via a transmission link of the EtherCAT bus from the master station, and storing the new firmware in the second storage area.

In the embodiment of the present invention, when a firmware upgrade is required for the slave station, the master station sends the firmware upgrade instruction to the slave station. In response to the firmware upgrade instruction, the slave station switches a work mode of the slave station to an upgrade mode, receives the new firmware corresponding to this firmware upgrade from the master station via the EtherCAT bus, and stores the new firmware in the second storage area of the flash memory of the slave station. As a simple example, the new firmware is received by a service data object (SDO) based on a preset transport protocol of the EtherCAT bus. The first storage area and the second storage area of the flash memory are independent of each other and have different functions. Accordingly, storing the new firmware in the second storage area of the flash memory of the slave station does not affect running the original firmware program in the first storage area.

Step 102: restarting the slave station after the new firmware is received.

In the embodiment of the present invention, a restart instruction is sent by the master station to restart the current slave station, after the new firmware is received and stored in the first storage area by the current slave station. As a simple example, the slave station can send a notification message to the master station, after the new firmware is received and stored in the first storage area. In another embodiment, the current slave station can restart by itself, after the new firmware is received and stored in the first storage area.

Step 103: copying the new firmware stored in the second storage area to the first storage area and executing the new firmware in the first storage area when the slave station is started.

In the embodiment of the present invention, when the slave station restarts, the slave station determines whether there is a new firmware in the second storage area, then in response to determining that there is the new firmware in the second storage area, the new firmware stored in the second storage area is copied to the first storage area and executed in the first storage area, and this firmware upgrade operation is completed.

In one embodiment, the step 103 above can be implemented based on the following steps:

Step A: determining whether a firmware stored in the second storage area is the new firmware when the slave station is started.

In the embodiment, the slave station determines whether the firmware stored in the second storage area of the flash memory is the new firmware at startup. Specifically, an update flag is set in the second storage area. When the new firmware is received from the master station, the update flag is set to 1 and the slave station is restarted. When the slave station determines that the update flag set in the second storage area is 1 at startup, it can be determined that the firmware stored in the second storage area is the new firmware. When the new firmware is copied to the second storage area, the update flag is set to 0. When the slave station determines that the update flag set in the second storage area is not 1 at startup, it can be determined that the firmware stored in the second storage area is not the new firmware.

Step B: in response to determining that the firmware stored in the second storage area is the new firmware, copying the new firmware to the first storage area, and executing the new firmware in the first storage area.

Step C: in response to determining that the firmware stored in the second storage area is not the new firmware, executing a firmware stored in the first storage area.

In one embodiment, the step A above also can be implemented based on the following steps:

Determining whether the firmware stored in the second storage area is the same as the firmware stored in the first storage area when the slave station is started.

In response to determining that the firmware stored in the second storage area is the same as the firmware stored in the first storage area, determining that the firmware stored in the second storage area is not the new firmware; and in response to determining that the firmware stored in the second storage area is not the same as the firmware stored in the first storage area, determining that the firmware stored in the second storage area is the new firmware.

In the embodiment of the present invention, the slave station compares whether the firmware programs stored in the first storage area and the second storage area are consistent at startup. If the firmware programs stored in the first storage area and the second storage area are not consistent, it is determined that there is the new firmware in the second storage area and a firmware upgrade operation is required for this startup, and then the steps of copying the new firmware stored in the second storage area to the first storage area and executing the new firmware in the first storage area are executed. Specifically, if there is the new firmware in the second storage area, an original firmware stored in the first storage area is deleted, the new firmware stored in the second storage area is copied to the first storage area and executed in the first storage area.

In one embodiment of the present invention, the flash memory of the slave station further includes a third storage area. The third storage area is configured to store a boot loader of the slave station. The boot loader of the slave station can be fixed in the third storage area. Normally, the boot loader of the slave station will not be updated or changed.

The slave station reads the boot loader of the slave station, determines whether the firmware stored in the second storage area is the new firmware, copies the new firmware stored in the second storage area to the first storage area in response to determining that the firmware stored in the second storage area is the new firmware, and executes the new firmware in the first storage area to complete this firmware upgrade operation, under the instruction of the boot loader of the slave station, at startup.

In the embodiment of the present invention, the EtherCAT bus is not only used for the firmware upgrade but also the communication between the master station and the slave station. Accordingly, the complexity of the whole communication system is reduced, firmware upgrades of multiple slave stations using the EtherCAT bus can be implemented, and the use of random access memory is maximized.

In the embodiment of the present invention, the flash memory of the slave station is partitioned into the first storage area configured to run firmware and the second storage area configured to store the new firmware. When the firmware upgrade instruction is received, the new firmware corresponding to this firmware upgrade is received via the transmission link of the EtherCAT bus and stored in the second storage area. After the new firmware is received, the slave station is restarted to copy the new firmware stored in the second storage area to the first storage area and execute the new firmware. Thus the firmware upgrade of the slave station is realized by using the transmission link of the EtherCAT bus. Because it does not need the help of the additional bus or tools, the convenience of the firmware upgrade and the security of the slave station can be improved.

It should be understood that the sequence number of each step in the above embodiment does not mean the order of execution sequence of the each step, the order of execution of each process should be determined by its function and internal logic, it should not be construed as limiting the implementation of the embodiments of the present invention.

The following is an embodiment of the device of the present invention, for the details that are not fully described in the embodiment of the device of the present invention, please refer to the corresponding method embodiments described above.

Figure 2:
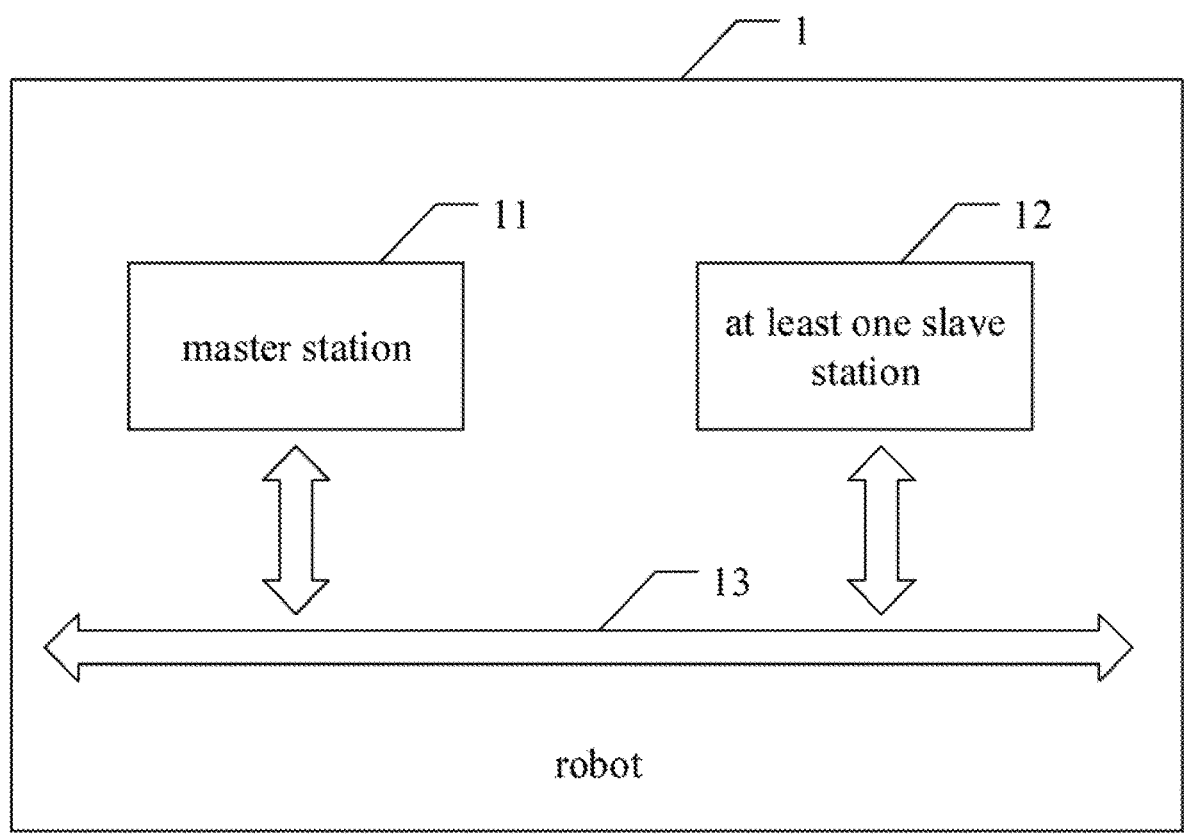
FIG. 2 is a schematic block diagram of the robot according to an embodiment of the present invention.
Figure 3:
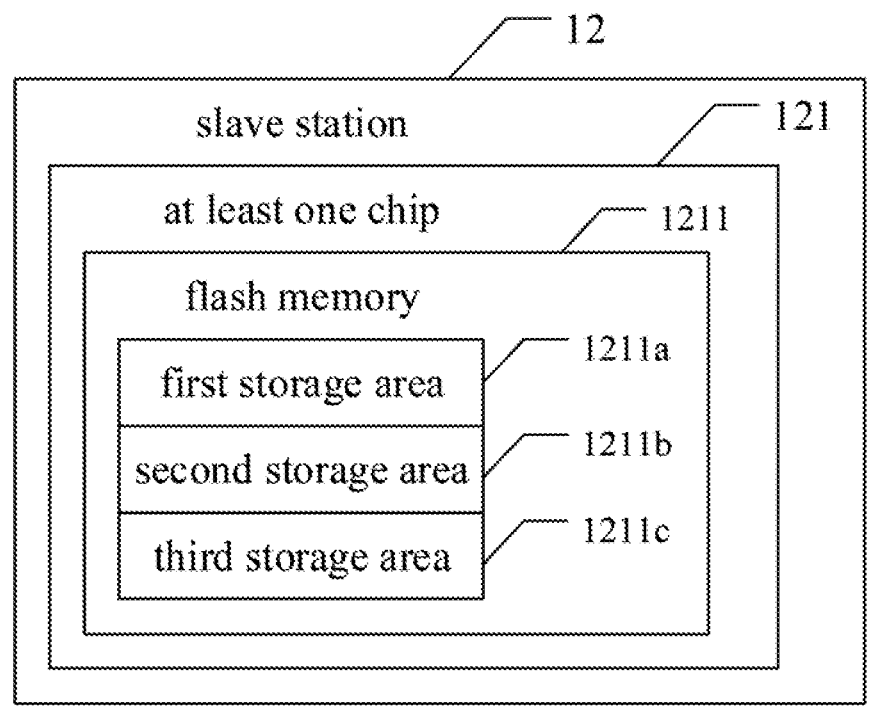
FIG. 3 is a schematic block diagram of the slave station of FIG. 2.

FIG. 2 is a schematic block diagram of the robot according to an embodiment of the present invention. FIG. 3 is a schematic block diagram of the slave station of FIG. 2. As shown in FIG. 2 and FIG. 3, the robot 1 includes a master station 11 and at least one slave station 12, and wherein the slave station 12 includes at least one chip 121 including a flash memory 1211.

The master station 11 and the at least one slave station 12 are electronically coupled to an EtherCAT bus 13 of the robot 1, the at least one slave station 12 communicates with the master station 11 via the EtherCAT bus 13. The flash memory 1211 includes a first storage area 1211a, a second storage area 1211b, and a third storage area 1211c. A firmware of the slave station 12 runs in the first storage area 1211a, and the third storage area 1211c is configured to store executable program instructions which when executed cause the slave station 12 to perform embodiments of the firmware upgrade method above.

In one embodiment of the present invention, the slave station 12 is an execution node of the robot, such as a sensor, or a servo, etc. The new firmware is received by the SDO based on a preset transport protocol of the EtherCAT bus.

In one embodiment of the present invention, the executable program instructions includes the boot loader of the slave station which when executed cause the slave station 12 to perform the step of copying the new firmware stored in the second storage area 1211b to the first storage area 1211a and executing the new firmware in the first storage area 1211a at startup.

In one embodiment of the present invention, a machine readable storage medium is also provided. The machine readable storage medium stores executable program instructions which when executed cause the slave station 12 of the robot 1 to perform embodiments of the firmware upgrade method above. The machine readable storage medium includes a first storage area and a second storage area. As a simple example, the machine readable storage medium may be the flash memory 1211 of the slave station 12 of the robot 1 above. In another embodiment, the machine readable storage medium may be a separate storage device.

In one embodiment, the machine readable storage medium further includes a third storage area, the executable program instructions comprises the boot loader of the slave station 12 stored in the third storage area which when executed cause the slave station 12 to perform the step of copying the new firmware stored in the second storage area to the first storage area and executing the new firmware in the first storage area at startup.

Figure 4:
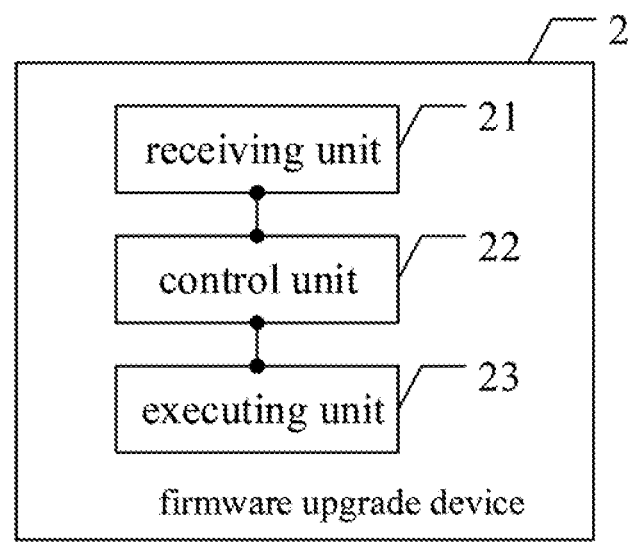
FIG. 4 is a schematic block diagram of a firmware upgrade device according to an embodiment of the present invention.

FIG. 4 is a schematic block diagram of a firmware upgrade device according to an embodiment of the present invention. For convenience of description, only parts related to the embodiment of the present invention are shown.

In one embodiment of the present invention, the firmware upgrade device is installed in a slave station of a robot. In another embodiment of the present invention, the firmware upgrade device is the slave station of the robot. The robot includes a master station and at least one slave station.

The master station and the slave station are electronically coupled to an EtherCAT bus of the robot, and the slave station communicates with the master station via the EtherCAT bus. A flash memory of the slave station includes a first storage area and a second storage area. A firmware of the slave station runs in the first storage area.

As shown in FIG. 4, the firmware upgrade device 2 for the firmware upgrade of the slave station includes: a receiving unit 21, a control unit 22, and an executing unit 23.

The receiving unit 21 is configured for receiving a new firmware corresponding to this firmware upgrade via a transmission link of the EtherCAT bus, and storing the new firmware in the second storage area, in response to a firmware upgrade instruction sent by the master station.

The control unit 22 is configured for restarting the slave station after the new firmware is received by the receiving unit 21.

The executing unit 23 is configured for copying the new firmware stored in the second storage area to the first storage area, and executing the new firmware in the first storage area when the slave station is started.

In one embodiment of the present invention, the flash memory further includes: a third storage area configured for storing a boot loader of the slave station.

The executing unit 23 is further configured for copying the new firmware stored in the second storage area to the first storage area and executing the new firmware in the first storage area when the slave station is started, based on the boot loader of the slave station.

In one embodiment of the present invention, the firmware upgrade device 2 further includes: a determining unit configured for determining whether a firmware stored in the second storage area is the new firmware, when the slave station is started.

The executing unit 23 is further configured for copying the new firmware to the first storage area and executing the new firmware in the first storage area, in response to determining that the firmware stored in the second storage area is the new firmware. The executing unit 23 is further configured for executing a firmware stored in the first storage area, in response to determining that the firmware stored in the second storage area is not the new firmware.

In one embodiment of the present invention, the firmware upgrade device 2 further includes: a judging unit configured for determining whether the firmware stored in the second storage area is the same as the firmware stored in the first storage area.

The determining unit is further configured for determining that the firmware stored in the second storage area is not the new firmware, in response to the judging unit determining that the firmware stored in the second storage area is the same as the firmware stored in the first storage area. The determining unit is further configured for determining that the firmware stored in the second storage area is the new firmware, in response to the judging unit determining that the firmware stored in the second storage area is not the same as the firmware stored in the first storage area.

In one embodiment of the present invention, the executing unit 23 is further configured for deleting an original firmware stored in the first storage area, copying the new firmware stored in the second storage area to the first storage area, and executing the new firmware in the first storage area, in response to the determining unit determining that the firmware stored in the second storage area is the new firmware.

In the embodiment of the present invention, the EtherCAT bus is not only used for the firmware upgrade but also the communication between the master station and the slave station. Therefore, the complexity of the whole communication system is reduced, the firmware upgrades of multiple slave stations using the EtherCAT bus can be implemented, and the use of random access memory is maximized.

In the embodiment of the present invention, the flash memory of the slave station is partitioned into the first storage area configured to run the firmware and the second storage area configured to store the new firmware. When the firmware upgrade instruction is received, the new firmware corresponding to this firmware upgrade is received via the transmission link of the EtherCAT bus and stored in the second storage area. After the new firmware is received, the slave station is restarted to copy the new firmware stored in the second storage area to the first storage area and execute the firmware. Thus the firmware upgrade of the slave station is realized by using the transmission link of the EtherCAT bus. Because it does not need the help of the additional bus or tools, the convenience of the firmware upgrade and the security of the slave station can be improved.

Figure 5:
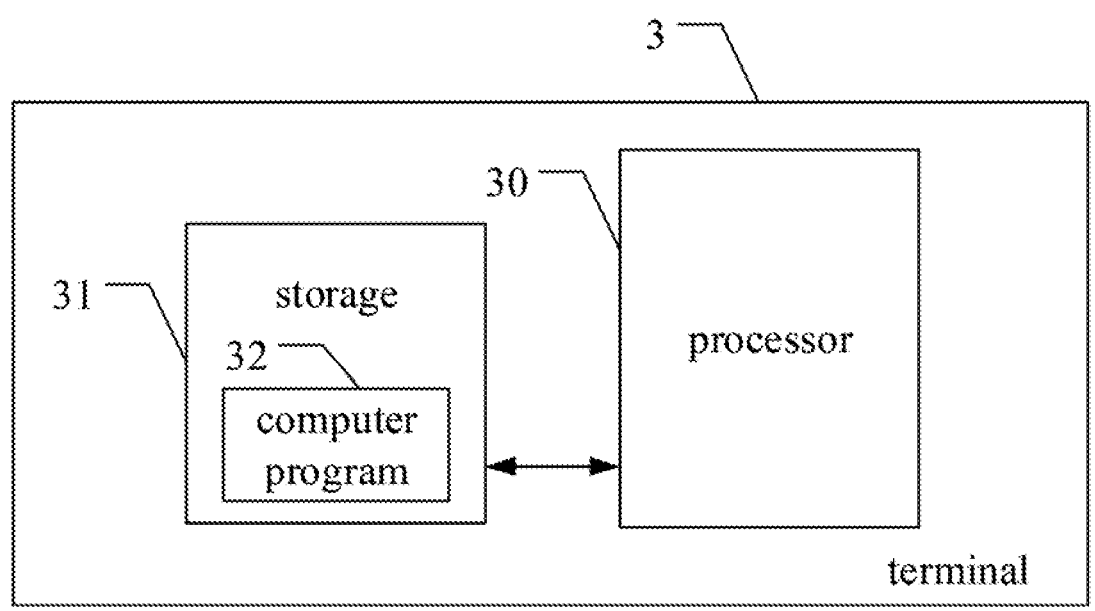
FIG. 5 is a schematic block diagram of a terminal according to an embodiment of the present invention.

FIG. 5 is a schematic block diagram of a terminal according to an embodiment of the present invention. As shown in FIG. 5, the terminal 3 includes: a processor 30, a storage 31, and a computer program 32 stored in the storage 31 and executable on the processor 30. When the processor 30 executes the computer program 32, the steps in the above embodiments of the firmware upgrade method are implemented, such as step 101 to step 103 shown in FIG. 1. In another embodiment, when the processor 30 executes the computer program 32, the function of each module or unit in the above embodiments of the device are implemented, such as the functions of unit 21 to unit 23.

In one embodiment, the computer program 32 can be divided into one or more modules/units that are stored in the storage 31 and executable by the processor 30. The one or more modules/units may be a series of computer program instruction segments capable of performing a particular function, the instruction segments being used to describe the execution process of the computer program 32 in the terminal 3. For example, the computer programs 32 can be divided into a receiving unit, a control unit and an executing unit, and functions of each unit are as follows:

The receiving unit is used for receiving a new firmware corresponding to this firmware upgrade via a transmission link of the EtherCAT bus, and storing the new firmware in the second storage area, in response to a firmware upgrade instruction sent by the master station.

The control unit is used for restarting the slave station after the new firmware is received by the receiving unit.

The executing unit is used for copying the new firmware stored in the second storage area to the first storage area, and executing the new firmware in the first storage area, when the slave station is started.

The terminal 3 maybe a robot, or the slave station of the robot. It will be understood by those skilled in the art that FIG. 5 is merely an example of the terminal 3, and does not limit the terminal 3. The terminal 3 may include components different in numbers from those illustrated, or incorporate some other different components. For example, the terminal 3 may also include an input and output device, a network access device, a bus, etc.

The processor 30 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 31 may be an internal storage unit of the terminal 3, such as a hard disk or a memory. The storage 31 may also be an external storage device of the terminal 3, such as a plug-in hard disk, a smart memory card (SMC), and a secure digital (SD) card, or any suitable flash cards. Furthermore, the storage 31 may also include both an internal storage unit and an external storage device. The storage 31 is used to store computer programs, other programs, and data required by the terminal. The storage 31 can also be used to temporarily store data that have been output or is about to be output.

A person skilled in the art can clearly understand that for convenience and brevity of descriptions, he/she can refer to the process in the foregoing method embodiments for a specific working process of the device and the units described above, and details are not described herein again.

In the embodiments above, the descriptions of the various embodiments have their respective focuses. For parts that are not detailed or described in a certain embodiment, related descriptions in other embodiments may be referred to.

A person skilled in the art will understand that the modules, units and/or method steps described in connection with the embodiments disclosed herein can be implemented by electronic hardware or a combination of computer software and electronic hardware. Whether these functions are performed in hardware or software depends on specific applications and design constraints of technical solutions. A professional technical person can use different methods for implementing the described functions for each particular application, but such implementation should not be considered to be beyond the scope of the present invention.

It should be understood that, according to the embodiments of the present disclosure, the disclosed apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, displayed or discussed couplings, direct couplings or communication connections between individual components may be implemented via indirect couplings or communication connections between some interfaces, devices or units, which may be electrical, mechanical or in other forms.

The units described as separate components may be or may not be separated physically. The components shown as units may be or may not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure or the part of the disclosure that contributes to conventional technologies or part of the technical solutions may be embodied in the form of a software product. The computer software product is stored in a storage medium and includes several instructions for instructing a computer device (which may be a personal computer, a server, a network device or the like) or a processor to implement all of or part of the steps of the methods according to the embodiments of the disclosure. The foregoing storage medium includes various media that can store programs, for example, USB disks, mobile hard disk drives, read-only memories (ROMs), random access memories (RAMs), magnetic disks, optical disks and the like.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A firmware upgrade method, comprising:

providing a robot comprising a master station and at least one slave station, wherein the master station and the at least one slave station are electronically coupled to an ethernet for control automation technology (EtherCAT) bus of the robot, the at least one slave station communicates with the master station via the EtherCAT bus, each of the at least one slave station comprises a flash memory, wherein the flash memory of the slave station is partitioned into a plurality of areas, the plurality of areas comprise a first storage area, a second storage area, and a third storage area configured to store a boot loader of the slave station, the first storage area and the second storage area are independent of each other and have different functions, and a firmware of the slave station runs in the first storage area;

switching, by the slave station, a work mode of the slave station to an upgrade mode in response to a firmware upgrade instruction sent by the master station, receiving a new firmware corresponding to this firmware upgrade from the master station via the EtherCAT bus, and storing the new firmware in the second storage area;

restarting the slave station, after the new firmware is received; and reading, by the slave station, the boot loader of the slave station from the third storage area, copying, by the slave station, the new firmware stored in the second storage area to the first storage area and executing the new firmware in the first storage area, under an instruction of the boot loader of the slave station, at startup.

2. The method as claimed in claim 1, wherein the step of copying, by the slave station, the new firmware stored in the second storage area to the first storage area at startup, and executing the new firmware in the first storage area, comprises:

determining, by the slave station, whether a firmware stored in the second storage area is the new firmware at startup; and in response to determining that the firmware stored in the second storage area is the new firmware, copying the new firmware to the first storage area and executing the new firmware in the first storage area;

wherein the method further comprises:

in response to determining that the firmware stored in the second storage area is not the new firmware, executing a firmware stored in the first storage area.

3. The method as claimed in claim 2, wherein the step of determining, by the slave station, whether the firmware stored in the second storage area is the new firmware at startup, comprises:

determining, by the slave station, whether the firmware stored in the second storage area is the same as the firmware stored in the first storage area at startup;

in response to determining that the firmware stored in the second storage area is the same as the firmware stored in the first storage area, determining that the firmware stored in the second storage area is not the new firmware; and in response to determining that the firmware stored in the second storage area is not the same as the firmware stored in the first storage area, determining that the firmware stored in the second storage area is the new firmware.

4. The method as claimed in claim 1, wherein the step of copying, by the slave station, the new firmware stored in the second storage area to the first storage area at startup, and executing the new firmware in the first storage area, comprises:

deleting, by the slave station, an original firmware stored in the first storage area, copying the new firmware stored in the second storage area to the first storage area, and executing the new firmware in the first storage area at startup.

5. The method as claimed in claim 1, wherein the master station is a main controller of the robot, and the slave station is an execution node of the robot.

6. The method as claimed in claim 1, wherein the new firmware is received by a service data object (SDO) based on a preset transport protocol of the EtherCAT bus.

7. The method as claimed in claim 2, wherein the method further comprises:

setting, by the slave station, an update flag in the second storage area, setting the update flag to 1 after the new firmware is received, and setting the update flag to 0 after the new firmware is copied to the second storage area;

the step of determining, by the slave station, whether the firmware stored in the second storage area is the new firmware at startup, comprises:

determining, by the slave station, whether the update flag is 1 at startup;

in response to the update flag is 1, determining that the firmware stored in the second storage area is the new firmware; and in response to the update flag is not 1, determining that the firmware stored in the second storage area is not the new firmware.

8. A slave station of a robot comprising a master station and at least one slave station, each of the at least one slave station comprising: at least one chip comprising a flash memory;

wherein the master station and the at least one slave station are electronically coupled to an ethernet for control automation technology (EtherCAT) bus of the robot, the at least one slave station communicates with the master station via the EtherCAT bus, the flash memory is partitioned into a plurality of areas, the plurality of areas comprise a first storage area, a second storage area, and a third storage area, the first storage area and the second storage area are independent of each other and have different functions, a firmware of the slave station runs in the first storage area, and the third storage area is configured to store executable program instructions which when executed cause the slave station to perform a method comprising:

in response to a firmware upgrade instruction sent by the master station, receiving a new firmware corresponding to this firmware upgrade from the master station via the EtherCAT bus, and storing the new firmware in the second storage area;

restarting the slave station, after the new firmware is received; and copying the new firmware stored in the second storage area to the first storage area and executing the new firmware in the first storage area at startup;

wherein the executable program instructions comprise a boot loader of the slave station which when executed cause the slave station to perform the step of copying the new firmware stored in the second storage area to the first storage area and executing the new firmware in the first storage area at startup.

9. The slave station as claimed in claim 8,
wherein the step of copying the new firmware stored in the second storage area to the first storage area and executing the new firmware in the first storage area at startup, comprises:
determining whether a firmware stored in the second storage area is the new firmware at startup; and
in response to determining that the firmware stored in the second storage area is the new firmware, copying the new firmware to the first storage area and executing the new firmware in the first storage area;
wherein the method further comprises:
in response to determining that the firmware stored in the second storage area is not the new firmware, executing a firmware stored in the first storage area.

10. The slave station as claimed in claim 9, wherein the step of determining whether the firmware stored in the second storage area is the new firmware, comprises:
determining whether the firmware stored in the second storage area is the same as the firmware stored in the first storage area;
in response to determining that the firmware stored in the second storage area is the same as the firmware stored in the first storage area, determining that the firmware stored in the second storage area is not the new firmware; and
in response to determining that the firmware stored in the second storage area is not the same as the firmware stored in the first storage area, determining that the firmware stored in the second storage area is the new firmware.

11. The slave station as claimed in claim 8, wherein the step of copying the new firmware stored in the second storage area to the first storage area and executing the new firmware in the first storage area at startup, comprises:
deleting an original firmware stored in the first storage area, copying the new firmware stored in the second storage area to the first storage area, and executing the new firmware in the first storage area at startup.

12. The slave station as claimed in claim 8, wherein the slave station is an execution node of the robot, and the new firmware is received by a service data object (SDO) based on a preset transport protocol of the EtherCAT bus.

13. A non-transitory machine readable storage medium storing executable program instructions which when executed cause a slave station of a robot to perform a method comprising:
in response to a firmware upgrade instruction sent by the master station of the robot, receiving a new firmware corresponding to this firmware upgrade from the master station via an ethernet for control automation technology (EtherCAT) bus of the robot, wherein the master station and the at least one slave station are electronically coupled to the EtherCAT bus, and the non-transitory machine readable storage medium is partitioned into a plurality of areas, the plurality of areas comprise a first storage area, a second storage area, and a third storage area configured to store a boot loader of the slave station, the first storage area and the second storage area are independent of each other and have different functions;
storing the new firmware in the second storage area;
restarting the slave station after the new firmware is received; and
copying the new firmware stored in the second storage area to the first storage area and executing the new firmware in the first storage area at startup;
wherein the executable program instructions comprise the boot loader of the slave station stored in the third storage area which when executed cause the slave station to perform the step of copying the new firmware stored in the second storage area to the first storage area and executing the new firmware in the first storage area at startup.

14. The non-transitory machine readable storage medium as claimed in claim 13,
wherein the step of copying the new firmware stored in the second storage area to the first storage area and executing the new firmware in the first storage area at startup, comprises:
determining whether a firmware stored in the second storage area is the new firmware at startup; and
in response to determining that the firmware stored in the second storage area is the new firmware, copying the new firmware to the first storage area and executing the new firmware in the first storage area;
wherein the method further comprises:
in response to determining that the firmware stored in the second storage area is not the new firmware, executing a firmware stored in the first storage area.

15. The non-transitory machine readable storage medium as claimed in claim 14, wherein the step of determining whether the firmware stored in the second storage area is the new firmware at startup, comprises:
determining whether the firmware stored in the second storage area is the same as the firmware stored in the first storage area at startup;
in response to determining that the firmware stored in the second storage area is the same as the firmware stored in the first storage area, determining that the firmware stored in the second storage area is not the new firmware; and
in response to determining that the firmware stored in the second storage area is not the same as the firmware stored in the first storage area, determining that the firmware stored in the second storage area is the new firmware.

16. The non-transitory machine readable storage medium as claimed in claim 13, wherein the step of copying the new firmware stored in the second storage area to the first storage area and executing the new firmware in the first storage area at startup, comprises:
deleting an original firmware stored in the first storage area, copying the new firmware stored in the second storage area to the first storage area, and executing the new firmware in the first storage area at startup.

17. The non-transitory machine readable storage medium as claimed in claim 13, wherein the slave station is an execution node of the robot, and the new firmware is received by a service data object (SDO) based on a preset transport protocol of the EtherCAT bus.

* * * * *